Nov. 21, 1961  R. D. WEBB  3,009,864
PROCESS CONTROL
Filed Sept. 18, 1958  3 Sheets-Sheet 3

Fig. 4.

——— PRESSURE IN TANK 50
——— POSITION OF 14
+++ POSITION OF 62
ooo POSITION OF 16 AND OUTPUT PRESSURE OF 42
▬▬ SWITCH CLOSED ——— PRESSURE IN TANK 50
+—+ POSITION OF 14 AND 62
ooo POSITION OF 16 AND OUTPUT
      PRESSURE OF 42
▬▬ SWITCH CLOSED

Fig. 5.

INVENTOR.
RALPH D. WEBB
BY Thomas J. O'Brien
ATTORNEY

United States Patent Office 3,009,864
Patented Nov. 21, 1961

3,009,864
PROCESS CONTROL
Ralph D. Webb, Charleston, W. Va., assignor to Union Carbide Corporation, a corporation of New York
Filed Sept. 18, 1958, Ser. No. 761,846
9 Claims. (Cl. 202—40)

This invention relates to process control employing an analyzer signal having a discontinuous readout characteristic. The discontinuity of signal may be an inherent characteristic of the analyzer employed, or it may be the intermittent usage of a signal from an analyzer producing a continuous signal.

Analyzing instruments having discontinuous readout characteristics find wide usage in industry for both laboratory and plant stream analyses. Also, economic considerations may make it desirable to use one analyzing instrument to intermittently analyze multiple process streams. Such practice produces a readout or signal that is intermittent relative to a given process stream even though the analyzer is of the continuous type. Because of such intermittent outputs, it has not been heretofore possible to advantageously use such analyzers for process control purposes.

It is, therefore, the primary object of the present invention to provide a novel system of process control utilizing an analyzer having a discontinuous output.

Other objects of the present invention are to provide such a system capable of utilizing a chromatographic output signal for control purposes, and to provide such a system capable of continuously controlling the physical parameters of a process by reference to a discontinuous signal source.

Other objects, features, and advantages of the present invention will be more clearly understood by reference to the following description and the embodiments of the appended drawings wherein.

The above objects are attained by measuring at least one physical parameter of a process and expressing the measurement as a periodic signal, converting each such periodic signal to a constant signal, and employing said constant signal to actuate process control apparatus to effect a change in the physical parameters of said process.

Figures 2, 3:
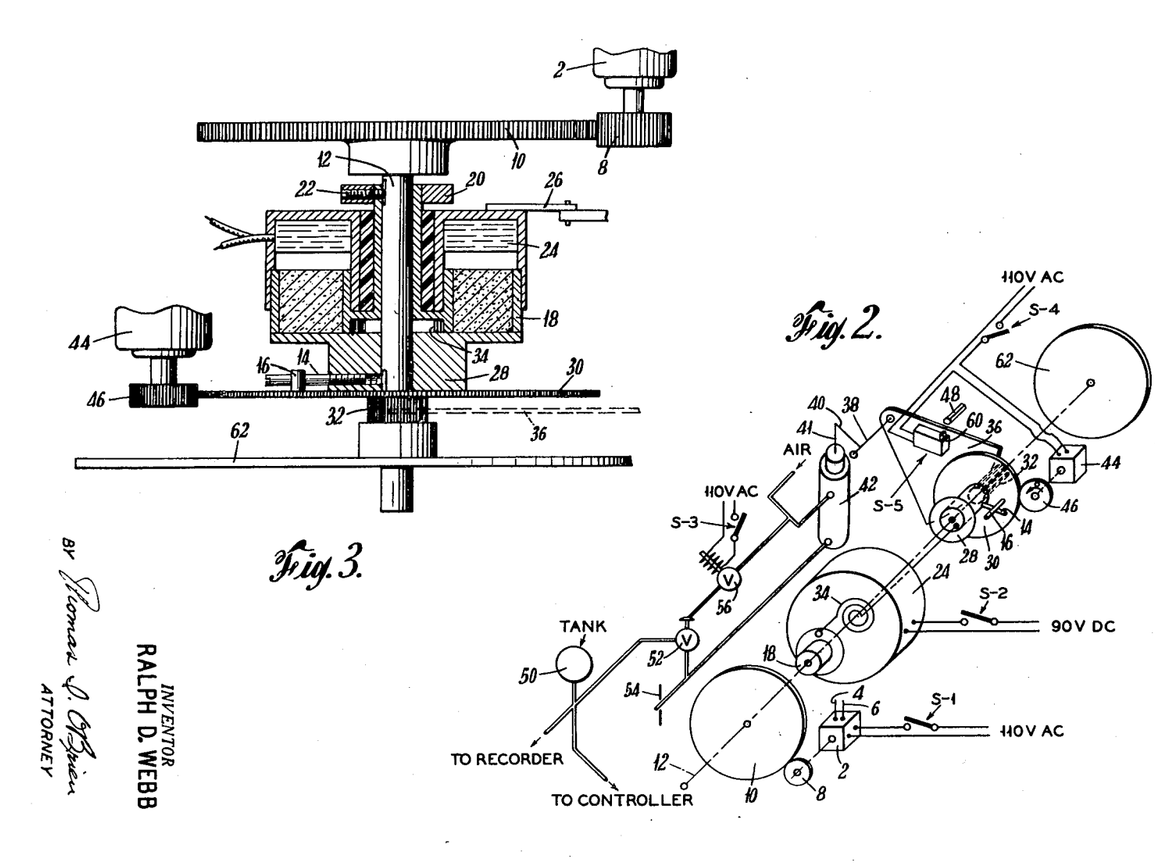
FIG. 2 is an exploded schematic representation of the various parts of a signal storage and actuating system of a type usable in the present invention.
FIG. 3 is a conventional mechanical drawing of the system of FIG. 2 taken along a cross-section of the rotatable shaft and showing the structural details of the magnetic clutch, the first and second rotatable members and a resilient means located between two elements which make up the first rotatable member.

The mechanical operation of a particular type of signal storage and actuating system capable of developing such a constant signal from a discontinuous signal source will be more fully understood by referring specifically to the embodiment of FIGS. 2 and 3.

Numeral 2 denotes a conventional servo motor which receives a signal through lines 4 and 6. The motor converts this input signal into a rotational-mechanical movement or angular displacement. Pinion gear 8 is fixedly attached to the motor shaft and drives bull gear 10 which, in turn is fixedly mounted on rotatable shaft or driving means 12. One element 18 of a first rotatable member is also fixedly engaged on the rotatable shaft by the collar 20 and the set screw 22. This first element 18 comprises one face or the driving member of a magnetic clutch. The windings of the magnetic clutch, indicated at numeral 24, are held in place by the torque arm 26 while the rest of the assembly rotates. A second element or portion 28 of the first rotatable member is located on the shaft adjacent to the first element. A second rotatable member, comprising a second bull gear 30 and a pinion gear 32 are mounted adjacent to the first rotatable member. The bull and pinion gears are rigidly mounted together and are free to turn on the rotatable shaft of the driving means. The second element constitutes a second face plate or driven member of the magnetic clutch. When the magnetic clutch is energized, the first and second elements of the first rotatable member are locked together. The second bull gear 30 and pinion 32 are freely mounted on the shaft 12 and rotate independently thereof.

Resilient means 34 is provided between the first and second portions 18 and 28 of the first rotatable member. The resilient means comprises a flat tightly-wound spring attached on one end to the rotatable shaft, or alternatively to the first portion of the first rotatable member since they are rigidly locked together, and attached at the other end to the second portion. The tension on the spring is such that whenever the magnetic clutch is de-energized, the second portion is rotatably urged from the first portion in a direction away from the reference position, or zero.

A pin 14 is radially disposed with respect to the second portion of the first rotatable member and is adapted to selectively lock the second portion 28 to the rotatable shaft. This pin also acts as a lever arm to contact a pin 16 located on the second bull gear 30. The pin 14 mounted on the second portion of the first rotatable member imparts the same angular displacement to the second bull gear 30 through the pin 16 that the second portion itself experiences.

A sector gear 36 is driven by the pinion gear 32 which is fixedly attached to the bull gear 30. This sector gear is fixedly mounted on a shaft 38 and imparts an angular displacement thereto which is proportionally related to the angular displacement of the bull gear 30. This proportion is determined by the tooth ratio between the pinion gear 32 and the sector gear 36. Rigidly attached to the shaft 38 is a lever 40 which is connected to the control arm 41 of a conventional pneumatic pressure regulator 42. The output pressure developed by the pressure regulator 42 is a function of the displacement of the control arm and is proportional to the signal received from the analyzer.

The output from the pneumatic pressure regulator is stored, or memorized, in a novel pneumatic circuit comprising a storage tank 50, a cutoff valve 52, an orifice 54, and a solenoid-operated valve 56. In the drawing, the cutoff valve 52 has been shown as a pneumatic diaphragm-operated valve actuated by the solenoid-operated valve, the latter valve obtaining its actuating pressure from the main air line. While a diaphragm-operated cutoff valve has been shown, it is to be understood that any sort of directly-operated valve responsive to an electrical signal may be used without departing from the scope of the invention. For example, a solenoid-operated valve as shown at 56 could be used provided that it had the desired flow and cutoff characteristics. The storage system from the cutoff valve including the tank 50 and the tubes or lines going to other devices as a recorder, etc. is static or closed.

In operation, the pneumatic memory device works as follows. When the pressure regulator control arm 41 has been set for a given point by the signal conversion portion of the apparatus, the switch S–3 closes whereby solenoid valve 56 is energized opening cutoff valve 52 by applying line air pressure to its actuating diaphragm. If the pressure in the output line of the pressure regular is lower than that existing in the storage tank 50, air is bled through the cutoff valve 52 and out through the orifice 54 until the pressure in the storage tank stabilizes at the air pressure in the output of the pressure regulator. The bleeder orifice is sufficiently small that the pressure regulator has no difficulty in maintaining required output pressure. As may be seen, the orifice functions primarily to drain off air when the previously stored pressure is greater than a subsequent one as indicated at the output of the regulator. If, on the other hand, the existing pressure in the storage tank is lower than the pressure in the output of the pressure regulator, air flows through the cutoff valve into the storage tank until the pressures are equal. Static pressure lines 80 are shown in the drawing going to a suitable recorder and to a suitable control device, such as pneumatic controller 62 of FIG. 1. Since the storage system is closed between readings, the previous output pressure reading from the pressure regulating valve is maintained until the cutoff valve is again opened. The switch S–3, which opens the solenoid air valve 56 to effect a readout of the pressure regulator output, is programmed to a preselected sequence corresponding to the elution time of the component being measured as will be more fully described hereinafter.

It will be noted that the bull gear 30, its associated pinion gear 32, the sector gear 36, and the control arm 41 of the regulator do not return to the zero reference point when the servo motor returns the rotatable shaft thereto. This is due to the fact that the bull gear and pinion gear are not keyed to the shaft and tend to remain in a set position because of the inertia, or frictional drag, of the gearing system associated therewith. To drive this system in a positive direction, a substantial force must be applied as when the pin 14 on the second rotatable member abuts in rotatable engagement with the pin 16 on the bull gear, or second rotatable member. Resetting the bull and pinion gears, or second rotatable member, to the reference point, or zero, is accomplished by a zeroing motor 44 which drives the second rotatable member back to zero through a suitable gear train as indicated at 46. This zero motor is actuated through a switch S–4 which is programmed according to a preselected sequence which shall also be explained hereinafter. It will be seen that a limit switch S–5 in the form of pin 48 and switch arm 60 are in the zero circuit. When the pin 48 strikes the switch actuator, the zero motor circuit is interrupted. This point is the established zero, or reference point, of the memory system and coincides with the "zero" or no input signal position of shaft 12. The member on the end of the rotatable shaft or driving means, indicated by the numeral 62 is merely a dial, or indicator, which shows on the front of the instrument casing the position of the rotatable shaft at any given instant. This is merely an indicator and does not constitute a necessary part of the system. When the second rotatable member is returned to the reference, or zero, point and the limit switch S–5 opens, the cycle is ready to be repeated.

Since the portion of the apparatus including the second bull gear 30, pinion gear 32, sector gear 36, linkages 38 and 40, and the pressure regulator control arm 41 assume and maintain positions in accordance with the maximum input signal magnitude, it will be referred to hereinafter as the "peak reading portion" of the apparatus.

The five switches shown in FIG. 2 are programming switches which control the sequence of events in the system. Switch S–1 in the field circuit of the servo motor allows the servo motor to follow the input signal from the analyzer fed in through lines 4 and 6. Switch S–2 is in the field of the magnetic clutch and when energized, or closed, the first and second rotatable members are locked together, whereby the second rotatable member follows the rotary motion of the rotatable shaft. When this switch is open, the magnetic clutch is released, and the second rotatable member is urged by the resilient spring 34 so that the pin 14 goes to whatever position has been assumed by the pin 16. Switch S-3, as stated above, is the air output switch and allows the particular pressure in the output of the pressure regulator to be stored in the storage tank 50. Switch S–4 is the zero return switch and completes the circuit to the zero return motor to energize same until the limit switch S–5 interrupts said circuit.

Figure 4:
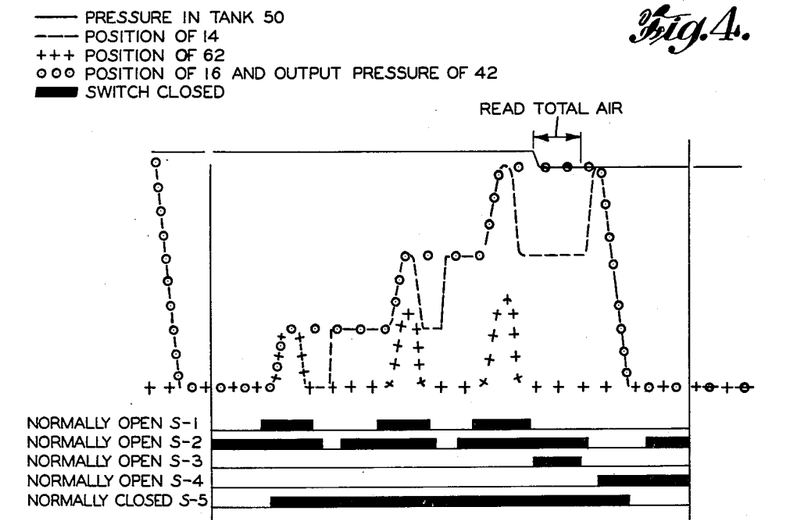
FIG. 4 is a graph showing displacement in the signal storage system plotted against time.

In the present embodiment of the invention, all of these switches are Microswitches and are mounted on a common base, their actuators contacting a common camshaft which is designed to perform one of two sequences of operation as will be discussed below. All of these switches are normally open unless contacted by their respective cam lobes except switch S–5 which is the reference point limit switch. This switch is normally closed and is open only when the arm 48 contacts the switch actuator 60 as stated above thus opening the zero motor circuit. The lower portion of FIGURE 4 shows the cam lobe design with respect to one complete operational cycle or revolution of said cam. The heavy portion indicates a cam lobe so located around the periphery of the cam shaft as to actuate the respective switch. The cam shaft is driven by a constant speed motor; the speed of which is determined by the needs of the process being monitored or controlled. A figure showing a cam shaft of particular configuration has not been shown since such cam profiles are conventional and are readily understood from such a graph by those skilled in the art.

FIG. 4 is a graphical representation of the operation of the apparatus when it is desired to add a number of separate input pulses and record or read out only the total value of this number. In the upper portion of this figure, the various lines show the pressure output and the angular displacement of various members of the apparatus plotted on one axis with time plotted on the other axis. In this particular example, the apparatus has been set up to measure three separate pulses, add their magnitudes, read the total air at the output of the pressure regulating valve and return the system to zero, whereupon the sequence is begun again. While this is shown, it is to be understood that the system can read up to five, ten, or even more separate impulses. Only the cam drive for switches S–1 and S–2 would have to be changed.

Going from left to right on this graph, as the servo switch S–1 is closed, the servo motor drives the rotatable shaft in a direction to follow the sampled pulse. Since the magnetic clutch is energized, the first position of the first rotatable member drives the second portion to its maximum position. Pin 14 on the second portion contacts pin 16 on the second rotatable member or bull gear 30 and likewise drives this member to the same angular displacement as the maximum attained by the said second portion. As the input signal returns to zero, or reference point, the rotatable shaft and the first rotatable member attached thereto also return to the reference position or zero. This is indicated by the series of crosses in the graph, which indicate the position of the dial 62 which is keyed directly to the shaft and gives a true indication of its angular displacement at a given time. A lobe on the cam next opens the switch S–2 and interrupts the field of the magnetic clutch. Upon release of the magnetic clutch, and pin 14 being retracted, the resilient member 34 rotates the second portion of the first rotatable member in the direction away from the reference point towards its previous displacement until the pin 14 strikes the pin 16. This is indicated by the dashed line which shows the position of pin 14. The second rotatable member and its associated pin 16 remain in the maximum position or angular displacement because of the friction of the gear train associated therewith. It is to be understood that the sector 36 and linkages 38 and 40 also remain in this position as indicated by the line composed of small circles which shows the output pressure from the regulator 42.

The switch S–2 is again closed, re-energizing the magnetic clutch and connecting the second portion of the first rotatable member directly to the first portion. Next, the servo switch S–1 is actuated by another lobe, which causes the servo motor to again advance the rotatable portion of the apparatus to a position above the reference point, as indicated by the series of crosses. Since the first and second positions of the first rotatable member are again rigidly connected by the magnetic clutch, the pin 14 drives the pin 16, and thus the second rotatable member, further around from the reference point, a distance equal to the maximum angular displacement of the rotating shaft for this signal. At this point the servo motor again returns the rotatable shaft and the members connected thereto to the reference zero, the pin 14 retreating from pin 16 an angular distance commensurate with the return of the rotatable shaft by the servo motor. At this point switch S–2 again interrupts the magnetic brake and the resilient means rotates the second portion of the first rotatable member, carrying the pin 14 until it again abuts against pin 16 on the third rotatable member. This process continues in a like manner until as many input signals are added as are desired. As may be seen, the angular displacement of each input signal, as effected by the servo motor, is reflected on the total angular displacement of the second rotatable member because of the ratcheting action of the magnetic clutch and the resilient member located between the first and second portions of the first rotatable member. This total angular displacement of the second rotatable member is reflected through the sector gear and its associated mechanical linkages to the control arm of the pneumatic pressure regulator as set forth above. Thus, the position of the control arm of the pressure regulator and the magnitude of the output pressure are a direct function of the total of the signals fed into the servo motor. Next, switch S–3 closes, which causes the air pressure in line 80 (FIG. 1) and in storage tank 50 to equalize with the output from the pressure regulator. Switch S–3 then opens thereby causing this pressure to be stored in the storage tank 50 as disclosed above. When this sequence of events is completed the switch S–2 in the magnetic clutch circuit is opened and the switch S–4 controlling the zero motor is closed, thus allowing the zero motor to return the second rotatable member and the parts directly connected thereto, or peak reading portion, as well as the second portion of the first rotatable member through pins 16 and 14 to the reference position or zero. As the system approaches zero, microswitch S–5, which operates as a limit contact, is opened, indicating when the reference point, or zero, has been reached. Upon closing switch S–2, an entire new cycle of events is ready to start. It will be noted also in this figure that the line of small circles denotes the angular position of the pin 16, as well as being indicative of the relative magnitude of the regulator output pressure, which in turn is indicative of the angular displacement of the peak reading portion of the apparatus, as reflected in the position of the control arm of the pressure regulator.

Figure 5:
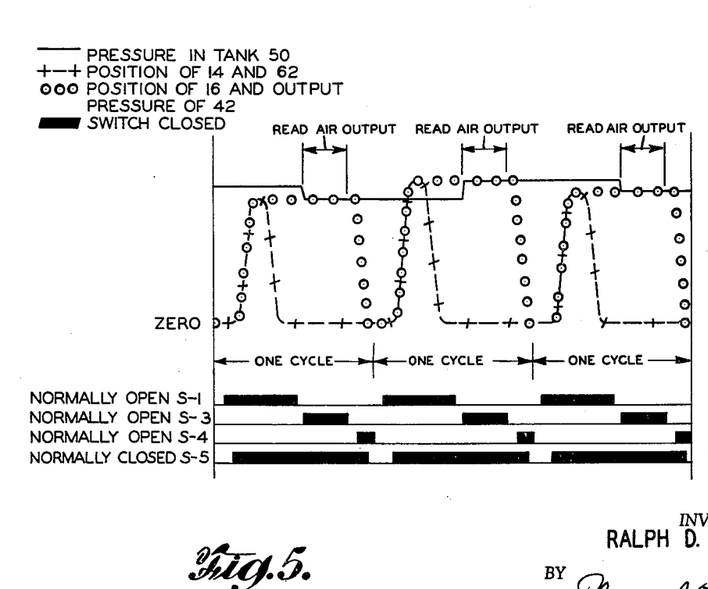
FIG. 5 shows a similar graph wherein the system is set up for a different mode of operation.

FIG. 5 is a similar drawing indicating a different mode of operation of the apparatus. In this mode of operation the air output from the pressure regulator is transmitted to the storage tank after a single input pulse is applied to the servo motor. In this embodiment the air pressure, as indicated at the storage tank, is caused to vary with the peak of each incoming signal. For this mode of operation, the pin 14 is advanced into the second portion of the first rotatable member until it firmly contacts the rotatable shaft, thus rigidly fastening the second rotatable member thereto. As may be seen this obviates the use of the magnetic clutch. As a matter of practice, the magnetic clutch could be entirely dispensed with and replaced by a single member directly fastened to the shaft if this were to be the only method of operation of the apparatus.

In this mode of operation, the sampling switch S–1 is closed, causing a signal to be applied to the servo motor. The servo motor causes the rotatable shaft to be displaced and the motion of the shaft is transmitted directly to the second portion of the first rotatable member from the shaft through the pin 14 locked thereon. The pin 14 engages the pin 16 and drives the third rotatable member to the position of maximum angular displacement required by the servo motor and rotatable shaft as dictated by the magnitude of the input signal. The angular displacement of the rotatable shaft and also of the pin 14 is indicated by the series of crosses in the graph. Pin 16 remains at this position of maximum angular displacement as do the sector gear 36 and the control arm of the pressure regulator. A short period of time is allowed for the pressure regulator to build up on the required pressure in its output line, and then switch S–3 causes its associated cutoff valve to open and allow the storage tank to assume the output pressure as dictated by said pressure regulator. When sufficient time has been allowed for the regulator output pressure to be stored in the storage tank 50 switch S–3 opens, locking this pressure in tank 50 and line 80. Switch S–4 then closes and energizes the zero motor which returns the second rotatable member and its apparatus to the reference point, or zero. As may be seen from the solid line in this figure, the air pressure in the storage tank at any given time is added to, or subtracted from, according to the peak magnitude of the input signal to the servo motor which is proportionally indicated by the regulator output. The discontinuous line indicates the angular position of the pin 16 and thus of the second rotatable member and all of the mechanical parts directly connected thereto, including the control lever of the pneumatic pressure regulator.

It will thus be seen that the signal storage and actuating system will transmit a steady pneumatic signal proportional either to the peak value of the given signal received from a measuring circuit or proportional to the sum of several such peaks. The programming switches of both the storage and actuating system and of the analyzer may be timed to admit only the signal corresponding to a given component or components while rejecting all other signals.

By the present invention, a method and apparatus are provided for process control making use of a peak reading device, one satisfactory type of such device being that described above and shown in FIGS. 2, 3, 4, and 5.

A chromatographic analyzer is an example of an instrument having a discontinuous readout of the type referred to above. In the chromatographic analyzer, a measured volume of fluid sample is swept into a separation column by means of a carrier gas. The column is packed with an adsorbent or absorbent material which selectively retards the passage of each component of the same therethrough. Each of the components is then eluted separately by the carrier gas and forms a simple binary mixture therewith. The thermal characteristics of each of these binary mixtures is then measured and compared with the thermal characteristics of the pure carrier gas as a reference. The difference is transmitted as an electrical signal to a recorder where it is most commonly recorded in the form of peaks or as a bar graph. The time for completion of one cycle is dependent on a large number of variables including the number of components, adsorbent or absorbent material used, and the particular components being measured. In any event, it will be obvious that there will be a lapse of time between successive readings of the same component. It is this fact that has thus far prevented the use of the chromatographic analyzer as a controller.

The specific disclosed embodiments of the invention relate to the application of a chromatograph to the production of ethylene. Ethylene is separated in columns by distillation of a complex mixture consisting of ethane, ethylene, acetylene, carbon dioxide, methyl acetylene, propane, the butanes, propylene, the butylenes, and perhaps traces or small amounts of carbon monoxide, nitrogen, hydrogen and methane. The overhead still make consists largely of ethylene, while the bottoms contain the other components. The ethylene content of the bottoms should be carefully controlled for reasons of economy—too great an amount causes losses of ethylene upon recycling of the bottoms to the cracking furnaces, and too small an amount requires excessive refrigeration and heating of the column.

Before the invention of the present method, steam flow to the base of the column was controlled to maintain a constant kettle temperature. This permitted a wide variation in ethylene percentage because temperature is not directly related to the ethylene content of the base liquid in such a multi-component system. This type of control resulted in large variations in the ethylene content of the bottoms and required a great deal of attention from the operators as they made repeated resettings of the temperature in an effort to maintain a reasonably constant ethylene content.

Figure 1:
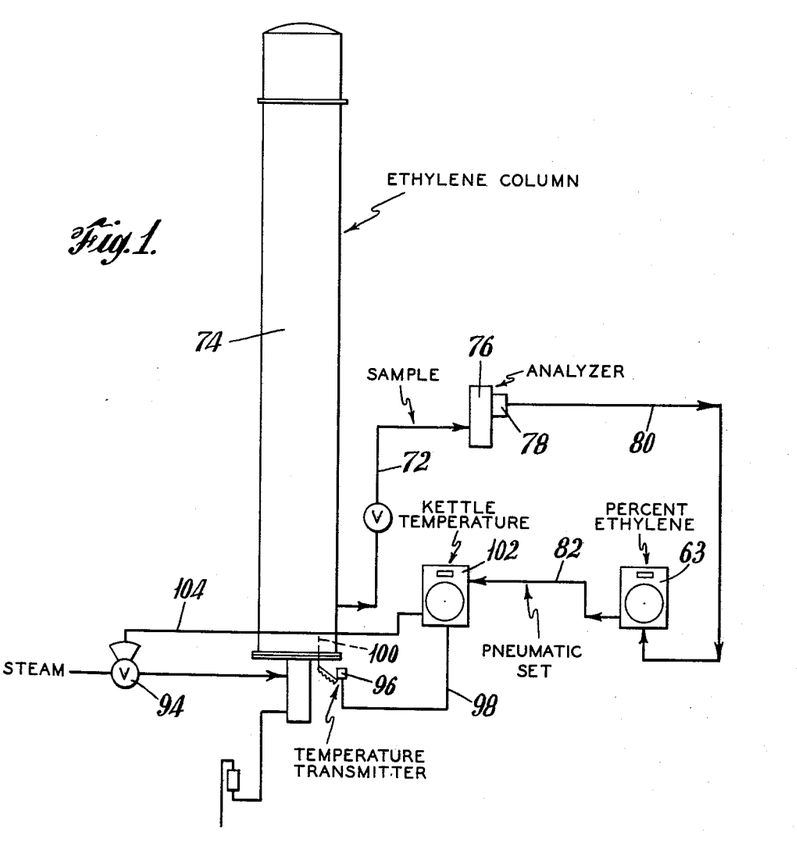
FIG. 1 is a schematic diagram of apparatus suitable for the practice of the invention to control the composition of material in a distilling column.

The invention may be more clearly understood by reference to the specific embodiment of FIG. 1 which discloses a method of controlling the output of a distillation unit by direct measurement of one or several components of a sample fluid in a chromatographic analyzer.

FIG. 1 illustrates apparatus for maintaining constant ethylene percentage by adjustment of steam flow control levels. A sample line 72 is provided from column 74 to chromatographic analyzer 76 and signal storage and actuating system 78. Signal line 80 connects system 78 with a standard commercial pneumatic recorder-controller having proportional and automatic reset control characteristics. Reset line 82 connects recorder-controller 63 with temperature controller 102. Pressure line 98 connects the temperature transmitter 96 and its temperature sensing element 100 with the temperature controller 102. Control line 104 connects the temperature controller with automatic steam flow control valve 94.

A measured sample is removed from column 74 through sample line 72 to chromatographic analyzer 76 which has a signal storage and actuating system 78, as described more fully above, combined therewith. The sample may be removed in the vapor phase or a liquid sample may be taken and vaporized externally. The intermittent electrical signal from the analyzer is thus converted to a steady-state pneumatic signal which is transmitted through the signal line 80 to recorder-controller 63. Recorder-controller 63 records the received signal as percent ethylene and simultaneously transmits a reset signal over reset line 82 proportional to the variation in ethylene content above or below a preset value. Temperature controller 102 continuously records the kettle temperature as the proportional signal is received over pressure line 98. The temperature controller 102 operates in a manner similar to controller 63 except that its control level is automatically adjusted and reset by controller 63 through reset line 82 rather than manually. The pneumatic output of controller 102 operates valve 94 to vary the flow of heating steam to column 74.

*Example*

In an example of the method of FIG. 1, the ethylene column of a gas separation plant was provided with the apparatus shown therein. The operating pressure of the column was 500 p.s.i.g. Feed consisted of 50 to 60 mol percent ethylene, the remainder being mostly $C_2$'s, $C_3$'s and $C_4$'s. The overhead product was greater than 90 percent ethylene with the remainder essentially ethane. The analyzer sample was taken from the vapor phase directly above the kettle liquid. The signal transmitted by the chromatographic analyzer and its attached signal storage system was a 3 to 15 p.s.i. pneumatic signal. The signal was transmitted to a standard "Foxboro" receiving type controller having a proportional plus reset control mechanism. The analyzer range was from 0 to 5 percent ethylene and control at 2 percent ethylene in the bottoms was attempted. The "Foxboro" controller pneumatically set the kettle liquid temperature controller which transmitted a controlling signal of 3 to 15 p.s.i. to the stream flow control valve. The thermal sensing element was a gas filled bulb which, upon variation in surrounding temperatures, transmitted a signal proportional to that temperature. Saturated steam under 20 p.s.i.g. pressure and having a temperature of 260° F. was utilized. Sampling period of the analyzer was 7 minutes. After each read-out from the analyzer, approximately 2 minutes was allowed before the next sampling to allow time for process response.

Using this type of control, kettle temperature was maintained between limits of 50° C. and 55° C. over a 24 hour period. During this same period, ethylene content was maintained within outer limits of 1.9 percent and 2.2 percent.

The above description has related primarily to a method of control wherein the signal storage system transmits a constant signal proportional to the peak of a particular measured component. Equally good, and sometimes better, results may be obtained by making use of the addition feature of the signal storage and actuating system wherein a constant signal proportional to the sum of the peaks of several components is transmitted. As an example, the signal produced by such a system in conjunction with a chromatographic analyzer has an accuracy of ±2 precent. If an ethylene stream having a purity of 95 percent and containing several impurities totalling 5 percent were to be controlled by the measurement of ethylene alone, the output signal would have an accuracy within ±2 percent of 95 percent or ±1.9 percent. If, however, the impurities are measured and a signal proportional to the sum of the peak values is produced, maximum variation would than amount to ±2 percent of 5 percent or ±0.1 percent. Where impurity content is known, such a system will be seen to have many advantages.

It has been discovered that proper sampling timing is an important feature of the present invention. Many unsuccessful attempts at process control utilizing an intermittent output have occurred because of improper timing. When chromatography is utilized, for example, a first major time lag will occur between the time the sample valve admits the sample to the chromatographic column and the time the sample is eluted and a signal is transmitted. In the example of the invention embodied in FIG. 1 and described above, the time lag between the actuating system and the steam valve adjustment is kept at a minimum. The second major lag occurs, however, between the adjustment of the steam valve and a corresponding change in ethylene output from the kettle—this may be termed the "process lag." In the past it has been thought desirable to sample the controlled stream as rapidly and so often as possible. When this was done, there was a multiplying of error which rendered accurate control impossible. Thus, if a second sample was taken before the system had reacted from the controlling action initiated by the first sample, an additional correction factor was added which resulted in over-control. In an attempt to stabilize the erratic control which resulted, samples were taken faster and oftener. This merely aggravated the condition and control became virtually impossible. It has now been discovered that by delaying each sampling step until the entire system has reacted to the control initiated by the preceding sampling, it has become possible to achieve a level of control not heretofore believed possible.

It will be clearly obvious from the preceding discussion that process control utilizing an analyzer having intermittent output is not only possible but has many advantages over any other available type of control. This invention makes it possible for the first time to continuously control a process by making use of the inherently periodic output of a chromatographic analyzer—and to achieve a preciseness of control practically unobtainable by any other means. Not only is the method of the invention adaptable to chromatography but it is equally suitable to other types of discontinuous analysis such as titration or to discontinuous use of continuous analyzers. Examples of the latter would include the use of a continuous analyzer on several processes in turn.

It is to be understood that, although the invention has been described with particular reference to control of a distillation column, it is not so limited. This invention may be used wherever discontinuous output analysis will resolve the variable to be controlled. A partial listing of possible applications of the invention to chromatography would include: (1) rectification; (2) thermal or catalytic gas cracking; (3) liquid scrubbing of gases; (4) liquid extraction; (5) combustion control by flue gas analysis; (6) chemical mixing; (7) chemical reactions in general by control of conditions or feeds resulting from analysis of the product or the reactants; and (8) ore reduction by analysis of off-gas. This is, of course, a partial list only and serves to emphasize the versatility and usefulness of the invention. Similarly, while a particular pneumatic signal transmitter has been described; it is to be understood that any type of "peak reading" apparatus capable of transmitting a steady signal proportional to each, or the sum, of several discontinuous outputs may be employed. Other instruments capable of performing the same function as the signal storage and actuating system described above are available such as a device manufactured by the Bristol Company commonly called a "peak picker." An all-electrical device capable of performing in a similar fashion was disclosed in an article entitled "Monitoring and Control with Automatic Chromatographic Analyzers" by M. M. Ferroux which appeared in the April 21, 1958, issue of The Oil and Gas Journal.

What is claimed is:

1. In a process having an apparatus for sampling the value of at least one physical parameter of said process and having process control apparatus to effect a sought change in the physical parameters of said process in accordance with a constant signal, the method of process control which comprises sampling at least one physical parameter of said process, expressing said sampled parameter as a periodic signal, converting each of said periodic signals to a constant signal and applying said constant signal to the process control apparatus to effect a change in the physical parameters of said process, allowing said sought change in said physical parameters to occur prior to a subsequent sampling thereof.

2. In a process wherein at least one selected variable physical parameter of the process has a predetermined desired value and assumes particular values in accordance with changes in the value of a controllable parameter of the process; a first apparatus being provided for sampling the at least one selected parameter of the process and for transmitting the value of the sampled parameter as an intermittent signal, and a second apparatus being provided for changing the value of the controllable parameter in accordance with the magnitude of a constant signal, the method of process control which comprises continuously sampling the at least one selected physical parameter at a predetermined interval to obtain an intermittent signal corresponding to the value of the selected parameter, periodically converting the intermittent signal to a first constant signal having a magnitude corresponding to the value of the sampled component represented by the intermittent signal at the time of the converting thereof, proving a second constant signal when the value represented by magnitude of said first constant signal is different from the predetermined desired value, the magnitude of said second constant signal having a predetermined relation to the difference between the value represented by the magnitude of said first constant signal and said predetermined desired value, applying said second constant signal to the second apparatus to change the value of the controllable parameter in accordance with said second constant signal, said change being in the direction such that the value of the selected parameter changes from its present value, in the direction of the desired value, toward a new value in accordance with said second constant signal and cyclically repeating the above steps, the step of periodically converting the intermittent signal to a first constant signal being performed at an interval determined by the response of the particular process, said interval being such that each conversion of the intermittent signal to a first constant signal is delayed at least until the change in the selected parameter, initiated after the previous conversion, has been substantially completed.

3. In a process wherein at least one selected variable physical parameter of the process has a predetermined desired value and assumes particular values in accordance with changes in the value of a controllable parameter of the process; a first apparatus being provided for sampling the at least one physical parameter of the process and for transmitting the value of the sampled parameter as an intermittent signal, and a second apparatus being provided for changing in the value of the controllable parameter in accordance with the magnitude of a constant signal, the method of process control which comprises, continuously sampling the at least one physical parameter at a predetermined interval to obtain an intermittent signal corresponding to the value of the selected parameter, periodically converting the intermittent signal to a first constant signal having a magnitude corresponding to the value of the sampled component represented by the intermittent signal at the time of the converting thereof, providing a second constant signal when the value represented by the magnitude of the first constant signal is different from the predetermined desired value, the magnitude of said second constant signal having a predetermined relation to the difference between the value represented by the magnitude of said first constant signal and said predetermined desired value and corresponding to a particular value of the controllable parameter, providing a third signal, the magnitude of said third signal continually representing substantially the actual value of the controllable parameter, providing a fourth constant signal when the value represented by the third signal is different from said particular value of the controllable parameter represented by said second signal, the magnitude of said fourth constant signal having a predetermined relation to the difference between the value represented by the third signal and said particular value of the controllable parameter represented by said second signal, applying said fourth constant signal to the second apparatus to change the value of the controllable parameter, said change being in the direction such that the value of the selected parameter changes from its present value, in the direction of the desired value, toward a new value in accordance with the magnitude of the said fourth signal and cyclically repeating the above steps, the step of periodically converting the intermittent signal to a first constant signal being performed at an interval determined by the response of the particular process, said interval being such that each conversion of the intermittent signal to a first constant signal is delayed at least until the change in the selected parameter, initiated after the previous conversion, has been substantially completed.

4. In a process wherein a plurality of selected variable physical parameters of the process have a predetermined desired total value, at least one of the selected parameters assuming a particular value in accordance with a change in the value of a controllable parameter of the process; a first apparatus being provided for successively sampling each of the plurality of selected parameters and for transmitting the value of each of the plurality of selected parameters as successive intermittent signals and a second apparatus being provided for changing the value of the controllable parameter in accordance with the magnitude of a constant signal, the method of process control which comprises, sampling each of the plurality of selected parameters to obtain a plurality of successive intermittent signals corresponding respectively to each of the plurality of selected parameters, said sampling being continuously repeated at a predetermined interval, periodically converting each of the successive intermitten signals to a first continuous signal having a magnitude corresponding to the value represented by the sum of the converted intermittent signals, providing a second constant signal when the value represented by the magnitude of the first constant signal is different from the predetermined desired total value, the magnitude of the second constant signal having a predetermined relation to the difference between the value represented by the magnitude of said first constant signal and said predetermined desired total value, applying said second constant signal to the second apparatus to change the value of the controllable parameter in accordance with said second constant signal, said change being in the direction such that the total value of selected parameters changes from its present total value toward a new total value in accordance with the said second constant signal and cyclically repeating the above steps, the step of periodically converting each of the successive intermittent signals to a first constant signal being performed at an interval determined by the response of the particular process, said interval being such that each conversion of the successive intermittent signal is delayed at least until the change in the total value of the selected parameters, initiated after the previous conversion, has been substantially completed.

5. In a process wherein a plurality of selected variable physical parameters of the process have a predetermined desired total value, at least one of the selected parameters assuming a particular in accordance with a change in the value of a controllable parameter of the process; a first apparatus being provided for successively sampling each of said plurality of selected parameters and for transmitting the value of each of said plurality of selected parameters as successive intermittent signals, and a second apparatus being provided for changing the value of the controllable parameter in accordance with the magnitude of a continuous signal, the method of process control which comprises, sampling each of the plurality of selected parameters to obtain a plurality of successive intermittent signals corresponding respectively to each of the plurality of selected parameters, said sampling being repeated continuously at a predetermined interval, periodically converting each of the successive intermittent signals to a first constant signal having a magnitude corresponding to the value represented by the sum of the intermittent signals, providing a second constant signal when the value represented by the magnitude of the first constant signal is different from the predetermined desired value, the magnitude of the second constant signal having a predetermined relation to the difference between the value represented by the magnitude of said first continuous signal and said predetermined desired value and corresponding to a particular value of the controllable parameter, providing a third signal, the magnitude of said third signal continually representing substantially the actual value of the controllable parameter, providing a fourth constant signal when the value represented by the third signal is different from said particular value of the controllable parameter represented by said second signal, the magnitude of said fourth constant signal having a predetermined relation to the difference between the value represented by the third signal and said particular value of the controllable parameter represented by said second signal, applying said fourth constant signal to the second apparatus to change the value of the controllable parameter in accordance with said fourth constant signal, said change being in the direction such that the total value of said selected parameter changes from its present total value toward a new total value in accordance with said fourth continuous signal and cyclically repeating the above steps, the step of periodically converting each of the successive intermittent signals to a first constant signal being performed at an interval determined by the response of the particular process, said interval being such that each conversion of the successive intermittent signal is delayed at least until the change in the total value of the selected parameters, initiated after the previous conversion, has been substantially completed.

6. In a process wherein at least one selected component of a fluid of the process has a predetermined desired concentration in the fluid, said selected component assuming a particular concentration in the fluid in accordance with a change in the rate at which thermal energy is supplied to the fluid, a first apparatus being provided for sampling the concentration of the selected component and for transmitting an intermittent signal corresponding to the concentration of the selected component, and a second apparatus being provided for changing the rate at which thermal energy is supplied to the fluid in accordance with the magnitude of a constant signal, the method of process control which comprises, continuously sampling the concentration of the selected component at a predetermined interval to obtain an intermittent signal corresponding to the value of the concentration of the selected component, periodically converting the intermittent signal to a first constant signal having a magnitude corresponding to the value of the concentration of the sampled component represented by the intermittent signal at the time of the converting thereof, providing a second constant signal when the value of the concentration represented by the magnitude of said first constant signal is different from the predetermined desired value of concentration, the magnitude of the second constant signal having a predetermined relation to the difference between the value of concentration represented by the magnitude of said first constant signal and said predetermined desired value of concentration, applying said second constant signal to the second apparatus to change the rate at which thermal energy is supplied to the fluid in accordance with said second constant signal, said change being in the direction such that the value of the concentration of the selected component changes from its present value, in the direction of its desired value, toward a new value of concentration in accordance with said second continuous signal and cylically repeating the above steps, the step of periodically converting the intermittent signal to a first constant signal being performed at an interval determined by the response of the particular process, said interval being such that each conversion of the intermittent signal to a first constant signal is delayed at least until the change in the concentration of the selected component, initiated after the previous conversion, has been substantially completed.

7. In a process wherein at least one selected component of a fluid of the process has a predetermined desired concentration in the fluid, said selected component assuming a particular concentration in the fluid in accordance with a change in the rate at which thermal energy is supplied to the fluid, a first apparatus being provided for sampling the concentration of the selected component and for transmitting an intermittent signal corresponding to the concentration of the selected component, and a second apparatus being provided for changing the rate at which thermal energy is supplied to the fluid in accordance with the magnitude of a constant signal, the method of process control which comprises, continuously sampling the concentration of the selected component at a predetermined interval to obtain an intermittent signal corresponding to the value of the concentration of the selected component, periodically converting the intermittent signal to a first constant signal having a magnitude corresponding to the value of the concentration of the sampled component represented by the intermittent signal at the time of the converting thereof, providing a second constant signal when the value of the concentration represented by the magnitude of said first constant signal is different from the predetermined desired value of concentration, the magnitude of the second constant signal having a predetermined relation to the difference between the value of concentration represented by the magnitude of said first constant signal and the predetermined desired value of concentration and corresponding to a particular desired value of thermal energy in the fluid, providing a third signal, the magnitude of said third signal continually representing substantially the actual value of thermal energy in the fluid, providing a fourth continuous signal when the value of thermal energy represented by the third signal is different from said particular desired value of thermal energy represented by said second signal, the magnitude of said fourth constant signal having a predetermined relation to the difference between the value of thermal energy represented by the third continuous signal and said particular value of thermal energy represented by said second signal, applying said fourth constant signal to the second apparatus to change the rate at which thermal energy is supplied to the fluid, said change being in the direction such that the value of the concentration of the selected component is caused to change from its present value, in the direction of the desired value, toward a new value in accordance with the magnitude of said fourth signal and cyclically repeating the above steps, the step of periodically converting the intermittent signal to a first constant signal being performed at an interval determined by the response of the particular process, said interval being such that each conversion of the intermittent signal to a first constant signal is delayed at least until the change in the concentration of the selected component, initiated after the previous conversion, has been substantially completed.

8. In a process wherein a plurality of selected components of a fluid of the process have a predetermined desired total concentration, the concentration of at least one of the selected components assuming a particular value in accordance with a change in the rate at which thermal energy is supplied to the fluid; a first apparatus being provided for successively sampling the concentration of each of the plurality of selected components and for transmitting the value of the concentration of each of the plurality of selected components as successive intermittent signals, and a second apparatus being provided for changing the rate at which thermal energy is supplied to the mixture in accordance with the magnitude of a constant signal, the method of process control which comprises continuously sampling the concentration of each of the plurality of selected components to obtain a plurality of successive intermittent signals corresponding respectively to the value of the concentration of each of the plurality of selected components, said sampling being repeated at a predetermined interval, periodically converting each of the successive intermittent signals to a first constant signal having a magnitude corresponding to the value of concentration represented by the sum of the intermittent signals, providing a second constant signal when the value of concentration represented by the magnitude of the first constant signal is different from the predetermined desired total value of concentration, the magnitude of the second constant signal having a predetermined relation to the difference between the value of concentration represented by the magnitude of said first constant signal and said predetermined value of concentration, applying said second constant signal to the second apparatus to change the rate at which thermal energy is supplied to the fluid in accordance with said second constant signal, said change being in the direction such that the total value of the concentration of the said selected components changes from its present values toward a new total value in accordance with said second constant signal and cyclically repeating the above steps, the step of periodically converting each of the successive intermittent signals to a first constant signal being performed at an interval determined by the response of the particular process, said interval being such that each conversion of the successive intermittent signals is delayed at least until the change in the total concentration of the selected components, initiated after the previous conversion, has been substantially completed.

9. In a process wherein a plurality of selected components of a fluid of the process have a predetermined desired total concentration, the concentration of at least one of the selected components assuming a particular value in accordance with a change in the rate at which thermal energy is supplied to the fluid; a first apparatus being provided for successively sampling the concentration of each of the plurality of selected components and for transmitting the value of the concentration of each of the plurality of selected components as successive intermittent signals, and a second apparatus being provided for changing the rate at which thermal energy is supplied to the mixture in accordance with the magnitude of a constant signal, the method of process control which comprises, continuously sampling the concentration of each of the plurality of selected components to obtain a plurality of successive intermittent signals corresponding respectively to the value of the concentration of each of the plurality of selected components said sampling being repeated at a predetermined interval, periodically converting all of the intermittent signals to a first constant signal having a magnitude corresponding to the value of concentration represented by the sum of the intermittent signals, providing a second constant signal when the value of concentration represented by the magnitude of the first constant signal is different from the predetermined desired value of concentration, the magnitude of the second constant signal having a predetermined relation to the difference between the value of concentration represented by the magnitude of said first constant signal and said predetermined desired total value of concentration and corresponding to a particular desired value of thermal energy in the fluid, providing a third signal, the magnitude of said third constant signal continually representing substantially the actual value of thermal energy in the fluid, providing a fourth constant signal when the value of thermal energy represented by the third constant signal is different from said particular desired value of thermal energy represented by said second signal, the magnitude of said fourth constant signal having a predetermined relation to the difference between the value of thermal energy represented by the third signal and said particular desired value of thermal energy represented by said second signal, applying said fourth constant signal to the second apparatus to change the rate at which thermal energy is supplied to the fluid, said change being in the direction such that the total value of the concentration of the selected components is caused to change from its present value, in the direction of the desired total value, toward a new total value, in accordance with the magnitude of said fourth signal and cyclically repeating the above steps, the step of periodically converting each of the successive intermittent signals to a first constant signal being performed at an interval determined by the response of the particular process, said interval being such that each conversion of the successive intermittent signals is delayed at least until the change in the total concentration of the selected components, initiated after the previous conversion, has been substantially completed.

References Cited in the file of this patent

UNITED STATES PATENTS

| | | |
|---|---|---|
| 2,014,906 | Munoz | Sept. 17, 1935 |
| 2,692,820 | Alway | Oct. 26, 1954 |
| 2,694,923 | Carpenter | Nov. 23, 1954 |
| 2,709,678 | Berger | May 31, 1955 |
| 2,758,793 | Stoops | Aug. 14, 1956 |
| 2,764,536 | Hutchins | Sept. 25, 1956 |
| 2,775,097 | Berestneff | Dec. 25, 1956 |
| 2,813,010 | Hutchins | Nov. 12, 1957 |
| 2,994,646 | Kleiss | Aug. 1, 1961 |